United States Patent
Roy et al.

(10) Patent No.: US 11,599,500 B2
(45) Date of Patent: Mar. 7, 2023

(54) SYSTEMS AND METHODS FOR SHARDING BASED ON DISTRIBUTED INVERTED INDEXES

(71) Applicant: Box, Inc., Redwood City, CA (US)

(72) Inventors: Shubhro Jyoti Roy, Foster City, CA (US); Anthony Urbanowicz, San Francisco, CA (US); James Huamonte, Aldie, VA (US); Poorva Potnis, Menlo Park, CA (US)

(73) Assignee: Box, Inc., Redwood City, CA (US)

( * ) Notice: Subject to any disclaimer, the term of this patent is extended or adjusted under 35 U.S.C. 154(b) by 284 days.

(21) Appl. No.: 16/600,106

(22) Filed: Oct. 11, 2019

(65) Prior Publication Data

US 2020/0117637 A1  Apr. 16, 2020

Related U.S. Application Data

(60) Provisional application No. 62/744,227, filed on Oct. 11, 2018.

(51) Int. Cl.
*G06F 16/13* (2019.01)
*G06F 16/14* (2019.01)
*G06F 16/182* (2019.01)

(52) U.S. Cl.
CPC ......... *G06F 16/137* (2019.01); *G06F 16/152* (2019.01); *G06F 16/183* (2019.01)

(58) Field of Classification Search
CPC ..... G06F 16/137; G06F 16/152; G06F 16/183
See application file for complete search history.

(56) References Cited

U.S. PATENT DOCUMENTS

| | | | | |
|---|---|---|---|---|
| 9,053,167 | B1* | 6/2015 | Swift | G06F 16/27 |
| 2012/0254175 | A1* | 10/2012 | Horowitz | G06F 16/278 707/737 |
| 2014/0149794 | A1* | 5/2014 | Shetty | H04L 67/1095 714/20 |
| 2014/0258255 | A1* | 9/2014 | Merriman | G06F 16/1827 707/704 |
| 2015/0254325 | A1* | 9/2015 | Stringham | G06F 16/278 707/737 |
| 2015/0319230 | A1* | 11/2015 | Skjolsvold | G06F 9/5077 709/224 |
| 2015/0379038 | A1* | 12/2015 | Nikolov | G06F 16/1815 707/622 |
| 2017/0337224 | A1* | 11/2017 | Gajic | G06F 16/21 |

* cited by examiner

*Primary Examiner* — Pierre M Vital
*Assistant Examiner* — Andrew N Ho
(74) *Attorney, Agent, or Firm* — Sheridan Ross P.C.

(57) ABSTRACT

According to one embodiment, distributing data across a plurality of storage shards can comprise generating a file key for each file of a plurality of files stored in a plurality of physical shards, each physical shard maintained by a node of a plurality of nodes in one or more clusters. The file key can comprise a hash of an enterprise identifier for an entity to which the creator of the file is a member, a hash of a folder identifier for a location in which the file is stored, and a hash of a file identifier uniquely identifying the file. The generated file keys can be sorted into an ordered list and the ordered list can be logically partitioning into a plurality of logical shards. Each logical shard of the plurality of logical shards can then be mapped to one of the plurality of physical shards.

20 Claims, 13 Drawing Sheets

SYSTEMS AND METHODS FOR SHARDING BASED ON DISTRIBUTED INVERTED INDEXES

CROSS REFERENCE TO RELATED APPLICATION

The present application claims the benefits of and priority, under 35 U.S.C. § 119(e), to U.S. Provisional Application No. 62/744,227 filed Oct. 11, 2018 by Roy et al., and entitled "Systems and Methods for Sharding Based on Distributed Inverted Indexes" of which the entire disclosure is incorporated herein by reference for all purposes.

BACKGROUND

Infrastructures for storing and searching files distribute files across all shards or partitions of any number of storage clusters at index time. Then, at query time, the search engine searches all shards and waits for them to respond. The main advantage of this approach is that shards grow uniformly. However, this approach also has some major drawbacks. For example, because queries are fanned out to every single shard, when one shard is unavailable, all results are considered to be incomplete. Therefore, queries are bottlenecked by the slowest cluster and shard even if the results from that shard are not relevant and may not be returned to the user. Unfortunately, there is no way to know this a priori. Rather, each shard has to process all queries even though most of them may not have relevant information. This leads to unnecessary load and wasteful consumption of resources on those machines which could be utilized to process other queries faster. Additionally, a single user or enterprise could overwhelm a whole cluster by performing expensive or high-throughput queries. Similarly, if a single shard or machine in a cluster has problems, the whole cluster becomes un-usable and the system needs to failover to a backup cluster. If there is no backup cluster available, there can be an outage of the system. Furthermore, when the system is scaled by adding a new machine, the query fanout increases and hence the query latency is also impacted. Hence, there is a need for improved methods and systems for distributing data across shards in a storage system.

BRIEF SUMMARY

Embodiments of the present disclosure utilize a deterministic sharding approach that provides the ability to route queries to specific shard(s), thereby reducing the query fanout. According to one embodiment, an enterprise-based sharding approach can be used to keep documents of an enterprise or other entity together on the same shard as far as possible rather than uniformly distributing them across shards. Then at query time, queries can be routed to those shards which contain documents from the querying user's enterprise.

According to one embodiment, a method for distributing data across a plurality of storage shards can comprise generating, by a server of a cloud-based storage system, a file key for each file of a plurality of files stored in a plurality of physical shards, each physical shard maintained by a node of a plurality of nodes in one or more clusters. The file key can comprise a hash of an enterprise identifier (enterprise ID) for an entity to which the creator of the file is a member, a hash of a folder identifier (folder ID) for a location in which the file is stored, and a hash of a file identifier (file ID) uniquely identifying the file. The generated file keys for each file of the plurality of files can be sorted into an ordered list and the ordered list can be logically partitioning into a plurality of logical shards. Each logical shard of the plurality of logical shards can then be mapped to one of the plurality of physical shards. A last key value for each logical shard in the partitioned ordered list can be identified and saved in a meta-store for the physical shard to which the logical shard is mapped.

According to another embodiment, a server of a cloud-based storage system can comprise a processor and a memory coupled with and readable by the processor. The memory can store therein a set of instructions which, when executed by the processor, causes the processor to distribute data across a plurality of storage shards by generating a file key for each file of a plurality of files stored in a plurality of physical shards, each physical shard maintained by a node of a plurality of nodes in one or more clusters. The file key can comprise a hash of an enterprise ID for an entity to which the creator of the file is a member, a hash of a folder ID for a location in which the file is stored, and a hash of a file ID uniquely identifying the file. The instructions can further cause the processor to sort the generated file keys for each file of the plurality of files into an ordered list, logically partition the ordered list into a plurality of logical shards, map each logical shard of the plurality of logical shards to one of the plurality of physical shards, identify a last key value for each logical shard in the partitioned ordered list, and save the identified last key value for each logical shard in a meta-store for the physical shard to which the logical shard is mapped.

According to yet another embodiment, a non-transitory, computer-readable medium can comprise a set of instructions stored therein which, when executed by a processor, causes the processor to distribute data across a plurality of storage shards by generating a file key for each file of a plurality of files stored in a plurality of physical shards, each physical shard maintained by a node of a plurality of nodes in one or more clusters. The file key can comprise a hash of an enterprise ID for an entity to which the creator of the file is a member, a hash of a folder ID for a location in which the file is stored, and a hash of a file ID uniquely identifying the file. The instructions can further cause the processor to sort the generated file keys for each file of the plurality of files into an ordered list, logically partition the ordered list into a plurality of logical shards, map each logical shard of the plurality of logical shards to one of the plurality of physical shards, identify a last key value for each logical shard in the partitioned ordered list, and save the identified last key value for each logical shard in a meta-store for the physical shard to which the logical shard is mapped.

Figure 1:
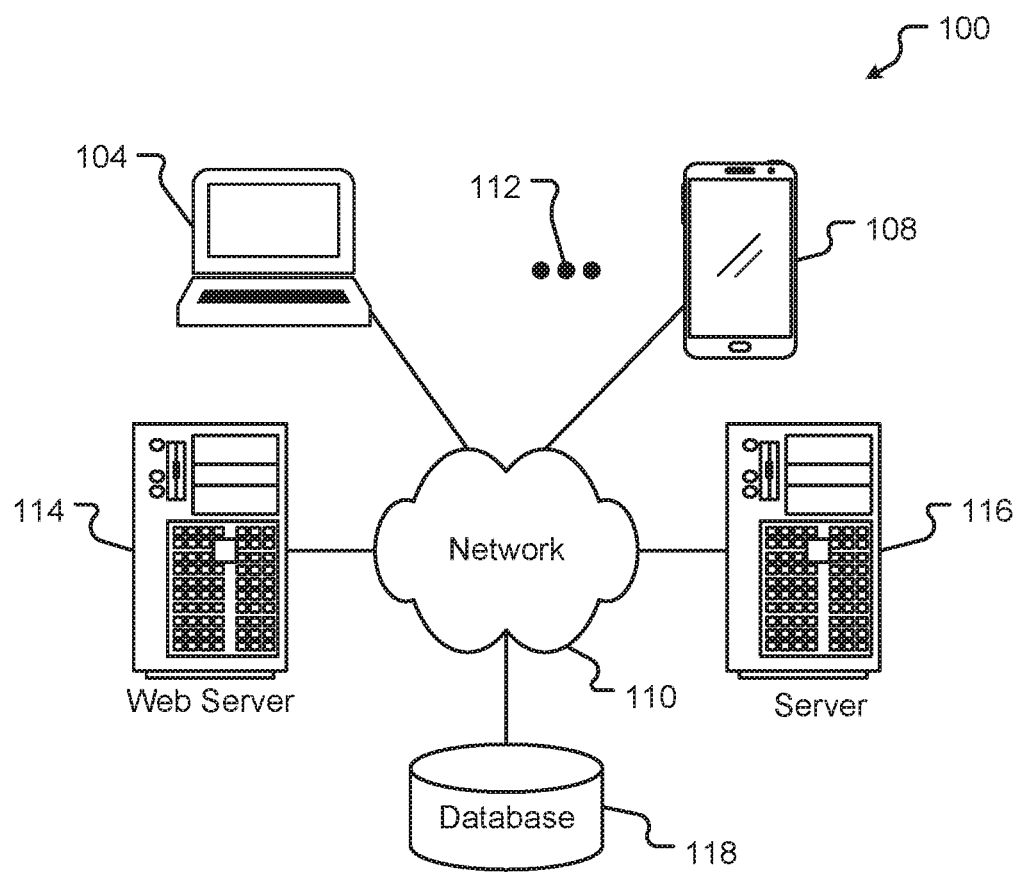
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure) (HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
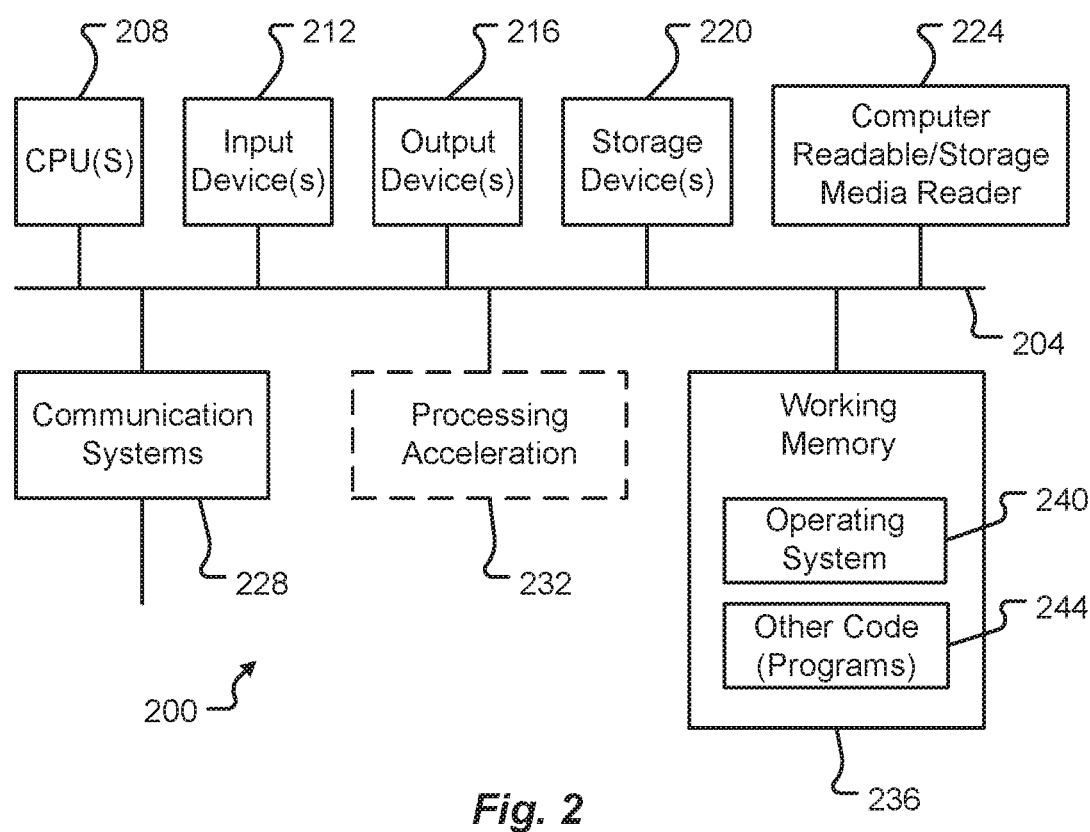
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
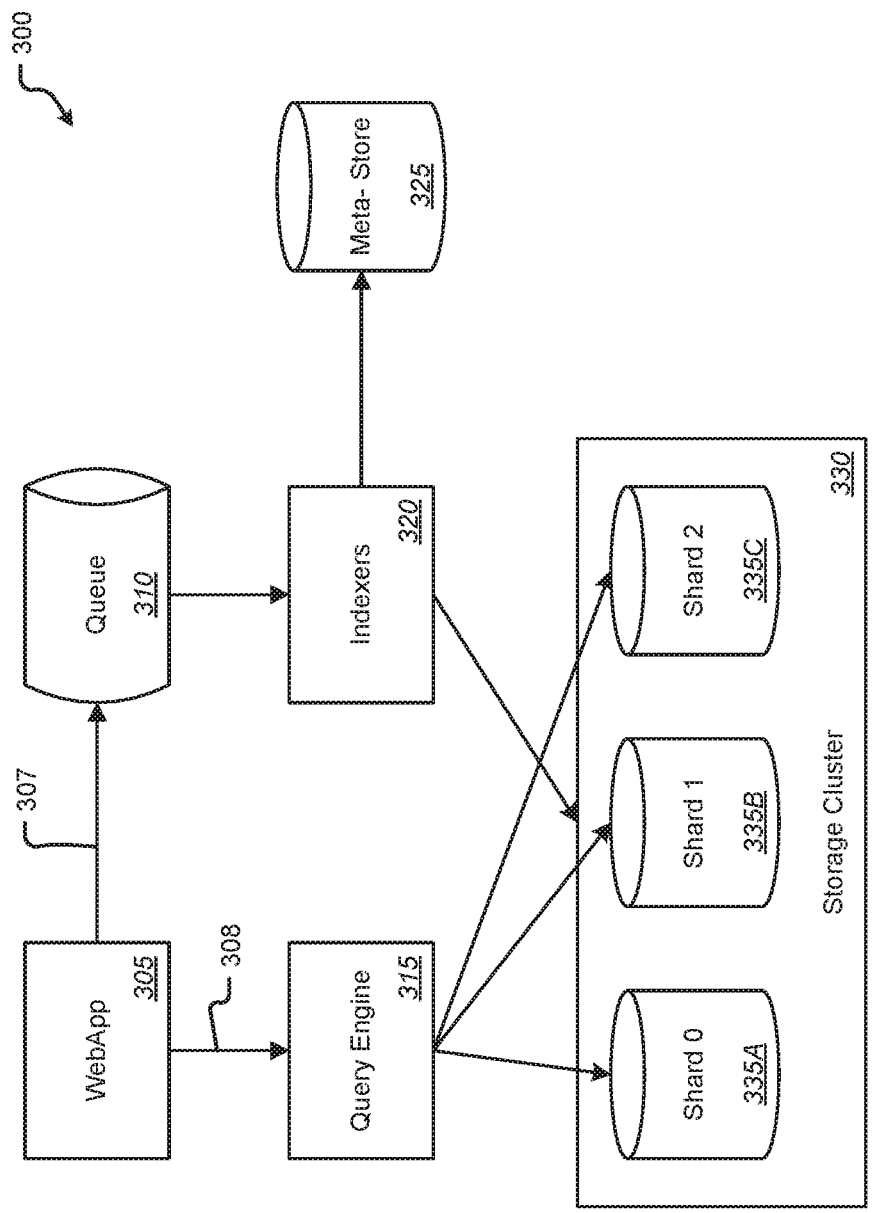
FIG. 3 is a block diagram illustrating elements of an exemplary system in which a sharding process can be implemented according to one embodiment of the present disclosure.

FIG. 3 is a block diagram illustrating elements of an exemplary system in which a sharding process can be implemented according to one embodiment of the present disclosure. As illustrated in this example, the system 300 can include a WebApp or web service through which users can access the system, initiate queries, receive results, etc. Once initiated, a query request 308 can be made to a query engine 315 and an index request 307 can be placed into a query queue 310. The system 300 can also comprise a query engine 315. The query engine 315 can comprise a service that serves live traffic and can send queries to shards 335A-335C of a storage cluster 330, collect results and then re-rank and return the most relevant results to the WebApp 305. As known in the art, the storage cluster 330 can comprise a number of shards 335A-335C. Each shard can comprise a horizontal partition of distributed data in the system 300. The system can also include a set of indexers. Generally speaking, the indexers 320 can comprise services responsible for reading files events (uploads, edits, etc.) and sending index requests to specific shards. According to one embodiment, the indexers 320 can comprise asynchronous batch processing systems that read batches of events from the queue and indexes them to the corresponding shards.

The system 300 can also comprise a meta-store 325. The meta-store 325 can maintain a set of keys for the information stored in the shards 335A-335C. The set of keys can comprise one key uniquely identifying each file in the shards 335A-335C. According to one embodiment, the key for a file can be based on information related to that file. As will be described, this information can comprise the enterprise ID for the enterprise or other entity to which the creator of the file belongs, a folder ID for the folder or location in which the file is stored, and the unique file ID for the file. This information can be used to generate a key uniquely identifying each file. These keys will then be used as the basis for distributing the files across the shards as will be described further below.

Figure 4:
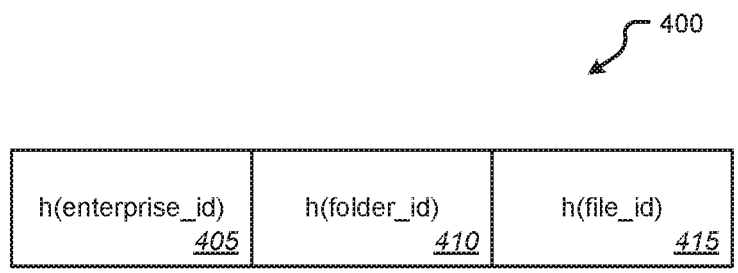
FIG. 4 is a block diagram illustrating an exemplary file key according to one embodiment of the present disclosure.

FIG. 4 is a block diagram illustrating an exemplary file key according to one embodiment of the present disclosure. As illustrated here, the file key 400 can be derived from three components: a hash of the enterprise ID 405; a hash of the folder ID 410; and a hash of the file ID 415. The hash (enterprise_id) 405 can be in the higher order bit positions which, as will be seen, allows documents for a given enterprise to be grouped together in sorted order and eventually end up in the same range bucket(s). The hash(folder_id) 410 provides another level of grouping for documents. The idea here is that documents within the same folder are similar and hence have a lot of common terms among them. The hash(file_id) 415 can form the lowest bits and ensures each file has a unique key. The enterprise_id, folder_id, and file_id are each monotonically increasing as enterprises, folders, and files are added to the system and have with wide gaps in ranges. Hashing these identifiers provides a more even distribution across the key space.

Figure 5:
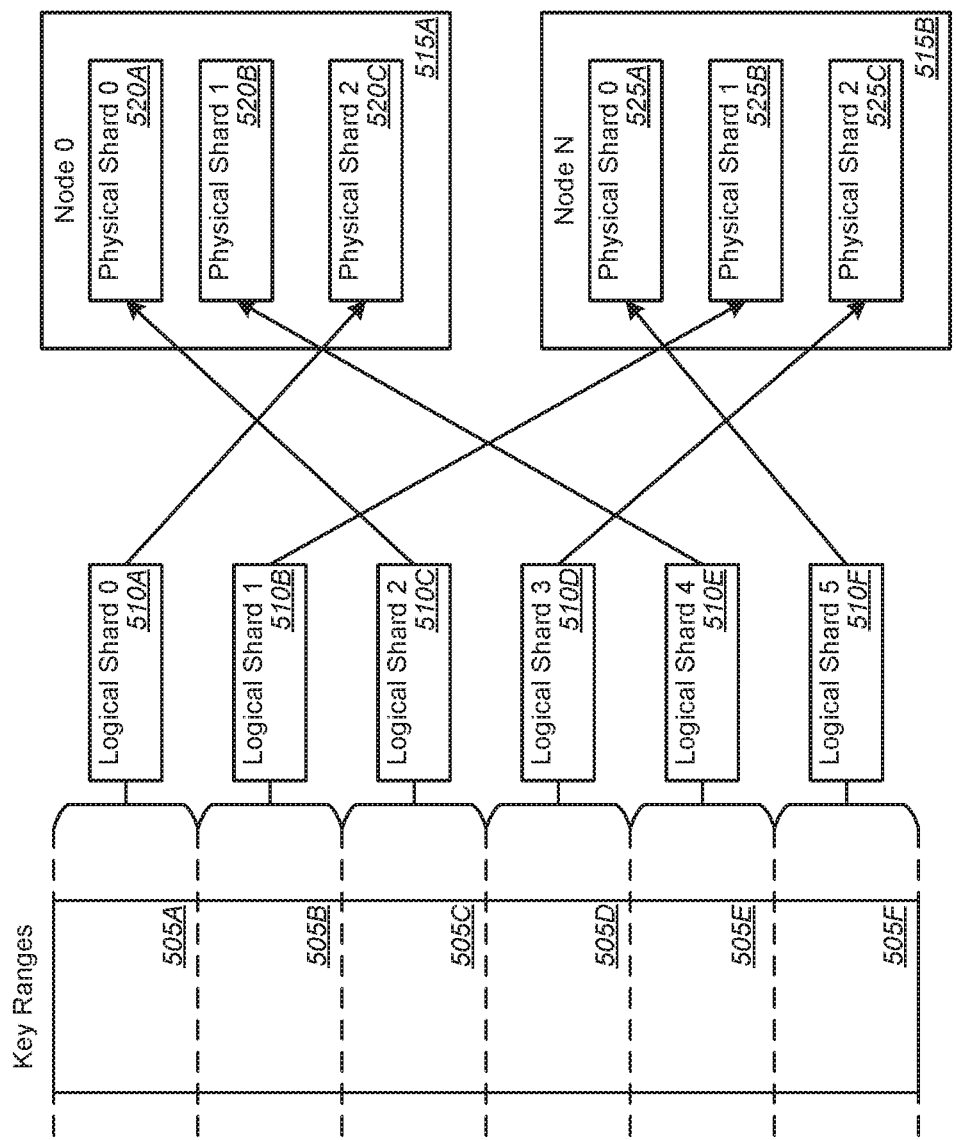
FIG. 5 is a block diagram illustrating key range partitioning according to one embodiment of the present disclosure.

FIG. 5 is a block diagram illustrating key range partitioning according to one embodiment of the present disclosure. Generally speaking, this partitioning provides for distribution of files across the shards and clusters of the system based on the generated file keys as described above. More specifically, the file keys can be sorted in byte order and this list, i.e., the key space, can be logically partitioned into a desired number of range buckets 505A-505F of equal size. Each range bucket 505A-505F can be treated as a logical shard 510A-510F which can then be mapped to a physical shard 520A-520C and 525A-525C on one or more machines 515A-515B. For each logical shard 510A-510E, the last key in the sorted order for that shard can be identified and saved. Then, at live index time the key bytes for the new document can be constructed and the shard it should be routed to can be determined based on the key ranges 505A-505E. Similarly, for queries, the querying user's enterprise_id can be used to identify the shards that the query should be routed to since the leading bytes of the file key are derived from the enterprise_id.

Figure 6:
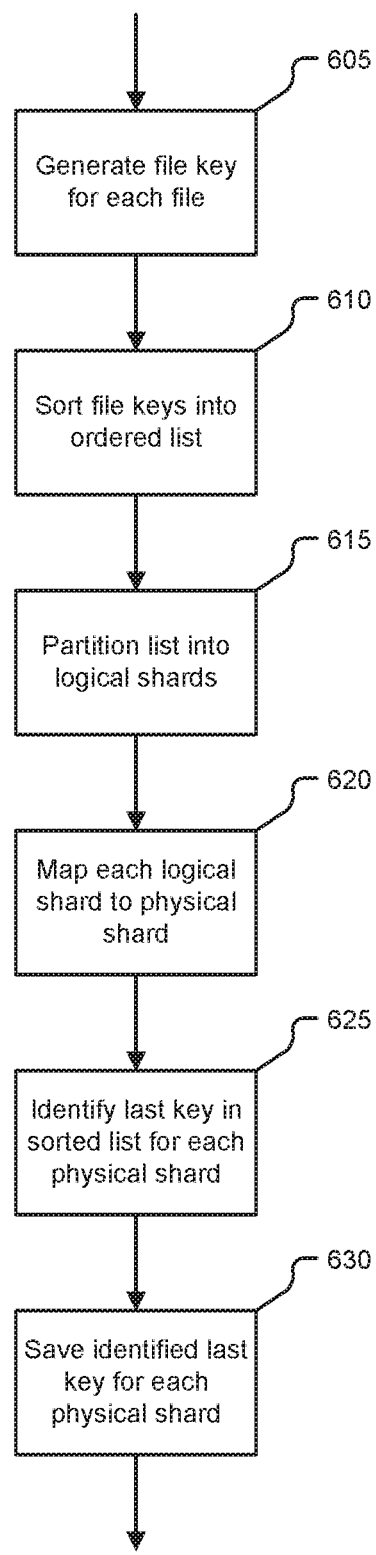
FIG. 6 is a flowchart illustrating an exemplary process for distributing data across a plurality of storage shards using key range partitioning according to one embodiment of the present disclosure.

FIG. 6 is a flowchart illustrating an exemplary process for distributing data across a plurality of storage shards using key range partitioning according to one embodiment of the present disclosure. As illustrated in this example, distributing data across a plurality of storage shards can comprise generating 605 a file key for each file of a plurality of files stored in a plurality of physical shards, each physical shard maintained by a node of a plurality of nodes in one or more clusters. The file key can comprise a hash of an enterprise identifier (enterprise ID) for an entity to which the creator of the file is a member, a hash of a folder identifier (folder ID) for a location in which the file is stored, and a hash of a file identifier (file ID) uniquely identifying the file. The generated file keys for each file of the plurality of files can be sorted 610 into an ordered list and the ordered list can be logically partitioning 615 into a plurality of logical shards. Each logical shard of the plurality of logical shards can then be mapped 620 to one of the plurality of physical shards. A last key value for each logical shard in the partitioned ordered list can be identified 625 and saved 630 in a meta-store for the physical shard to which the logical shard is mapped.

Figure 7:
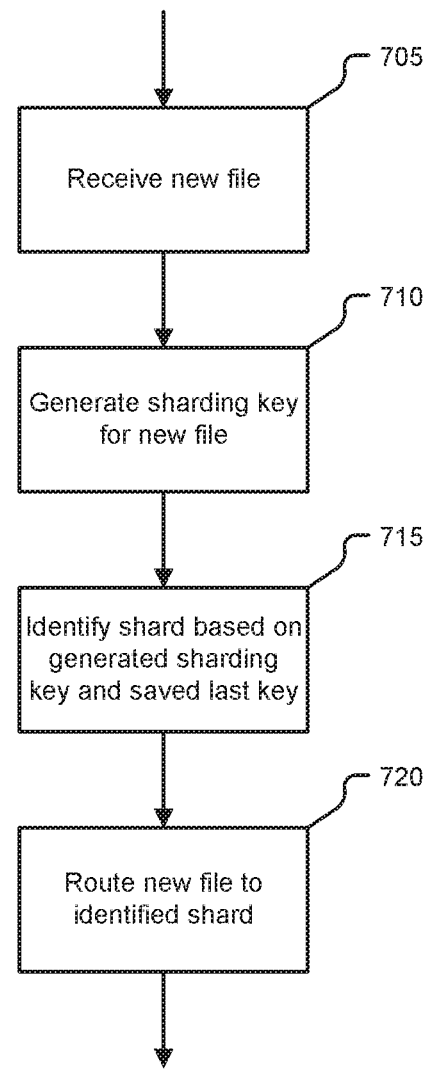
FIG. 7 is a flowchart illustrating an exemplary process for indexing a document according to one embodiment of the present disclosure.

FIG. 7 is a flowchart illustrating an exemplary process for indexing a document according to one embodiment of the present disclosure. As illustrated in this example, indexing a new file in the plurality of physical shards can comprise receiving 705 the new file and generating 710 a file key as described above for the new file. A target shard for the new file can then be identified 715 based on the generated file key for the new file and the saved identified last key value for each logical shard saved in the meta-store for each physical shard and the new file can be routed 720 to the identified target shard.

Figure 8:
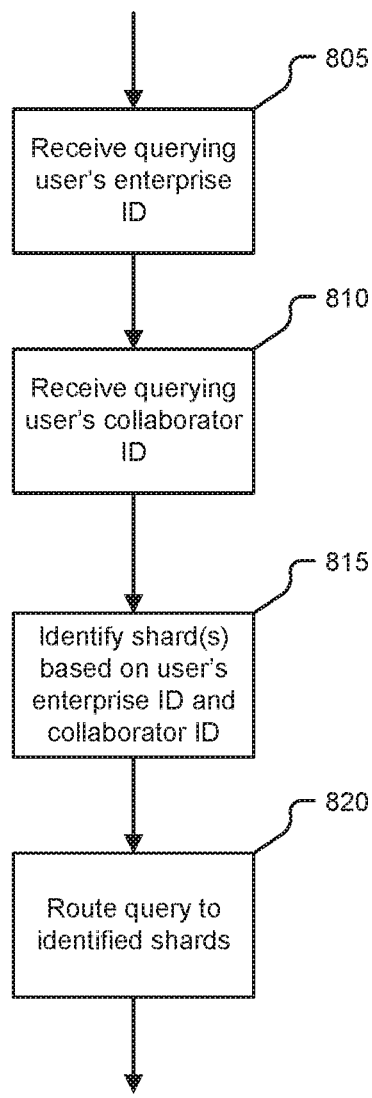
FIG. 8 is a flowchart illustrating an exemplary process for conducting a query according to one embodiment of the present disclosure.

FIG. 8 is a flowchart illustrating an exemplary process for conducting a query according to one embodiment of the present disclosure. As illustrated in this example, processing a query from a user can comprise receiving 805 an enterprise ID associated with the user. One or more shards that can be targets of the query can be identified 810 based on the received enterprise ID associated with the user and the saved identified last key value for each logical shard saved in the meta-store for each physical shard. The query can then be routed 815 to the identified one or more shards.

Using this enterprise based-sharding approach, the throughput measured, for example, in Queries Per Second (QPS), may be unevenly distributed across shards which could potentially result in hot-spotting. More importantly if multiple QPS heavy shards get assigned to the same machine then that machine could be operating under much higher load than others and could become prone to issues. Hence in order to make the distribution of queries more uniform across machines, the logical shards can be mapped to physical shards on machines using a bin-packing technique where the logical shards a mapped to machines (bins) based on their QPS. The QPS can be determined based on historical data for each enterprise or other entity.

For example, using a descending first fit algorithm, bin-packing can comprise sorting the logical shards based on QPS in descending order, from the highest QPS to lowest. Beginning at the top of this sorted list, i.e., with the logical shards having the heaviest QPS, one logical shard can be assigned to each physical shard. The remaining, unassigned logical shards can then be re-sorted in ascending order of QPS, from lightest to heaviest, and starting at the top of this sorted list with the lightest QPS logical shard, one logical shard can be assigned to each physical shard, e.g., in the same order in which heavy QPS logical shards were assigned. Thus, heavy QPS logical shards and light QPS logical shards can alternately be assigned to each physical shard. This process can be repeated until all logical shards have been assigned. This bin-packing approach is a modification of the original problem. The original bin-packing problem tries to minimize the number of bins whereas here the number of bins/machines is fixed and we are trying to minimize the weight of each bin aka the QPS. The mathematical representation of this would be:

$$\text{Minimize} \sum_{J=n}^{J=0} (wi \ xij) \text{for each bin}$$

$$x_{ij} \in \{0, 1\}$$

$$w_i = \text{weight of items}$$

$$n = \text{number of bins}$$

Alternatively, any other greedy algorithm can be used to assign logical shards to physical shards depending upon the implementation. For example, Descending First Fit is also a greedy algorithm. BinPacking itself is an unsolved problem in computer science so we can use approximate greedy approaches which provide closest to optimal solutions to this problem.

Once assigned, certain shards can grow at a faster rate as compared to others due to disproportionate growth rates of various enterprises. This can be a major issue for the search system 300 since some machines will reach disk capacity while others will remain under used. This would lead to under-utilization of available resources. According to one embodiment, this can be addressed by re-indexing the cluster. This would rebuild the key ranges and re-index the cluster thus leveling out any skew in shard size. But this would require the cluster to be removed from serving live traffic and re-indexed offline. The process has significant downtime and hence may be reserved for certain situations, such as when adding new machines.

According to another embodiment, a process of virtual sharding can be performed in which key ranges 505A-505F can be mapped to virtual shards where the number of virtual shards is much larger than number of physical shard. In case of a machine running close to disk capacity the virtual shards/ranges on that machine can be split to create new ones and they can be assigned to another machine which has available capacity or a new machine altogether. This way the virtual shard to machine mapping can be altered without altering the key ranges in any way. The indexes on the specific physical shards being altered can then be rebuilt but the rest of the shards can continue serving live traffic.

Figure 9:
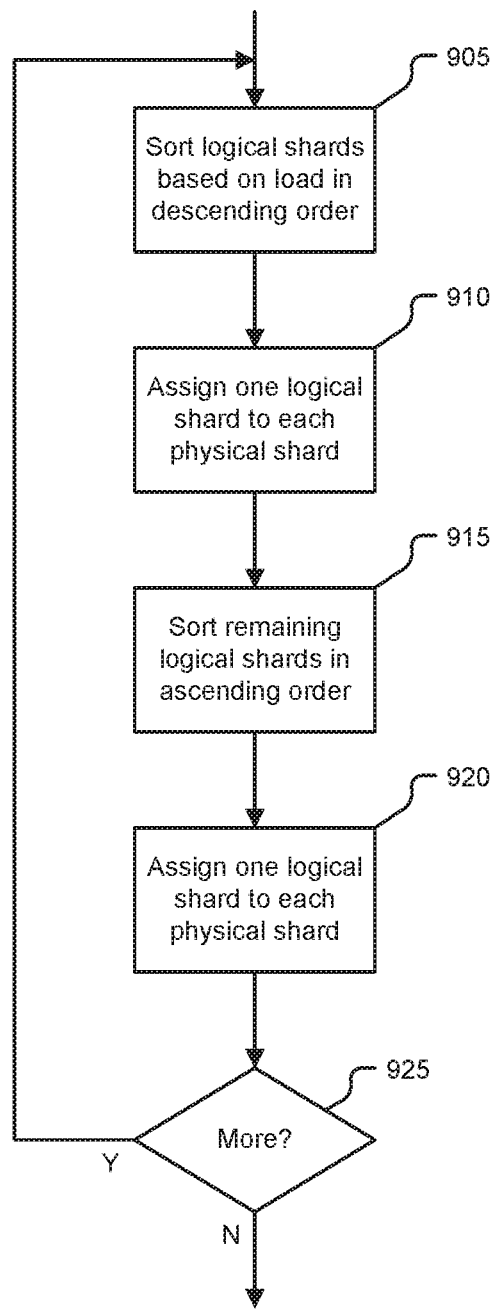
FIG. 9 is a flowchart illustrating additional details of an exemplary process for distributing data across a plurality of storage shards using key range partitioning according to one embodiment of the present disclosure.

FIG. 9 is a flowchart illustrating additional details of an exemplary process for distributing data across a plurality of storage shards using key range partitioning according to one embodiment of the present disclosure. As illustrated in this example, mapping each logical shard of the plurality of logical shards to one of the plurality of physical shards can further comprise sorting 905 the plurality of logical shards in descending order based on a load of each logical shard. Beginning from a top of the sorted ordered list, one logical shard can be assigned 910 to each physical shard of the plurality of physical shards. Remaining, unassigned logical shards can then be sorted 915 in ascending order based on the load of each remaining unassigned logical shard and one logical shard, beginning from the top of the sorted ordered list, can then again be assigned 920 to each physical shard of the plurality of physical shards. A determination 925 can then be made as to whether all logical shards have been assigned to a physical shard. In response to determining 925 not all logical shards have been assigned to a physical shard, sorting 905 of the plurality of logical shards in descending order based on a load of each logical shard, assigning 910 one logical shard beginning from a top of the sorted ordered list to each physical shard of the plurality of physical shards, sorting 915 of remaining unassigned logical shards in ascending order based on the load of each remaining unassigned logical shard, and assigning 920 one logical shard beginning from the top of the sorted ordered list to each physical shard of the plurality of physical shards can be repeated until a determination 925 is made that all logical shards have been assigned to a physical shard.

One of the main drawbacks with key range partitioning as mentioned earlier, is that it greedily tries to fit as much of an enterprise's files as possible on a single shard. As a result even mid-size enterprises (with ~500 million files) will entirely fit on a single shard. However, if the enterprise has a high growth rate, which is often the case for enterprises this size, that shard may start running out of disk space soon shard spilling may be needed. Additionally, if the enterprise has a high QPS, it can lead to the classic hot-spotting problem. Bin-packing by QPS can remediate this to an extent at the machine level but may still continue being an issue at the shards. For example, that shard can still have higher than average latencies since that process may be under heavy load.

These issues can be addressed by distributing an enterprise's files across a number (k) of shards when they exceed a specified size, where k is much smaller than the total number of shards. In this way the query fanout can be reduced to a great extent but also hot-spotting issues can be avoided. One of the ways to do this can be to use virtual sharding where the number of virtual shards is much larger than the number of physical shard. The number of virtual shards can be determined by a predetermined maximum size for enterprises to reside on a single shard. The key ranges can be assigned to virtual shards and then these virtual shards can be mapped to physical shards as shown above. Virtual shards can be assigned to physical shard so that no two shards of an enterprise land on the same physical shard. In this way, larger enterprises can be distributed across more than one physical shard and hence the load will be distributed. The mapping of physical shard to a machine can continue to be allocate based on physical shard QPS estimates as described above.

In this way, virtual shard to physical shard mapping can performed so that large enterprises are at least split across k shards. Bin-packing by shard growth rate, i.e., based on estimates of enterprise growth rate on that virtual shard, can also be performed to get a better distribution of growth. Additionally, virtual shard mapping can be altered for load balancing purposes without altering the key ranges. Shard splitting, as will be described below, can be implemented by increasing the number of virtual shards without increasing the number of physical shards. Shard spilling can be implemented by adding a new virtual shard to the impacted physical shard key range and then mapping that virtual shard to a different physical shard which has more headroom.

Shard spilling involves sending new index requests for shards to some other shard(s). In use, there may be some shards which grew very little and hence could be good candidates for spillover. The spillover itself can be triggered at the shard or machine level when they are running close to capacity. At a high level, the spillover involves identifying a shard that needs to be spilled over and identifying candidate spillover shards based on headroom on those machines/shards. Ideally, the spillover process can spillover a given shard to more than one shard so that the growth rate of a fast-growing shard can be distributed. To do so, additional logic can be applied at index time to pick one of the spilled over shards such as through mod of hash(file_id) etc. The override map in meta-store can be updated and the update can be federated to query engine followed by indexers.

Figure 10:
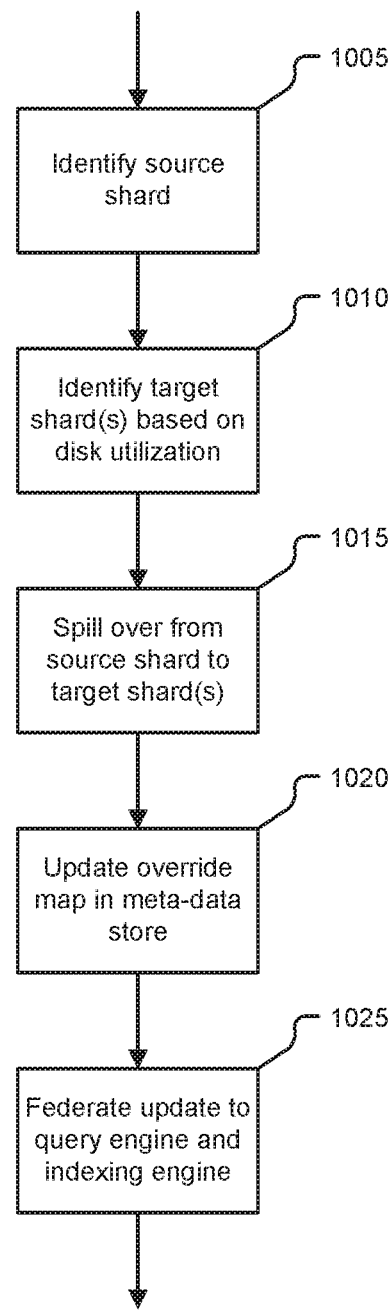
FIG. 10 is a flowchart illustrating an exemplary process for shard spilling according to one embodiment of the present disclosure.

FIG. 10 is a flowchart illustrating an exemplary process for shard spilling according to one embodiment of the present disclosure. As illustrated in this example, spilling over a source shard of the plurality of physical shards to a target shard of the plurality of target shards can comprise identifying 1005 the source shard based on available storage capacity of each physical shard of the plurality of physical shards. The target shard(s) can be identified 1010 based on the available storage capacity of each physical shard of the plurality of physical shards. Content, i.e., files, can then be spilled over 1015 from the source shard to the target shard(s). An override map of the meta-store for the source shard and the target shard can be updated 1020 based on this spill over and the update to the override maps can be federated 1025 to one or more components of the cloud-based storage system, e.g., a query engine and/or indexer as will be described below.

In dynamic spilling which shard(s) to spill to can be dynamically determined. For this purpose search operations can identify the most optimal spillover shards, among the existing shards in the cluster. This can be done in one of the following way: get disk space available for all nodes in the cluster; pick the smallest shards on the machines with largest headroom; possibly spill a shard to at least 2 shards on different machines so as to distribute the load (the fanout could also be configured as a spill factor); do linear/hash probing of shards and check head room on the corresponding machines; define a threshold below which a shard is a candidate for spillover; based on this, select the first shard that satisfies the spillover criterion. As mentioned before, the number of shards to spillover to can be determined based on a spillover factor specified by user.

Figure 11:
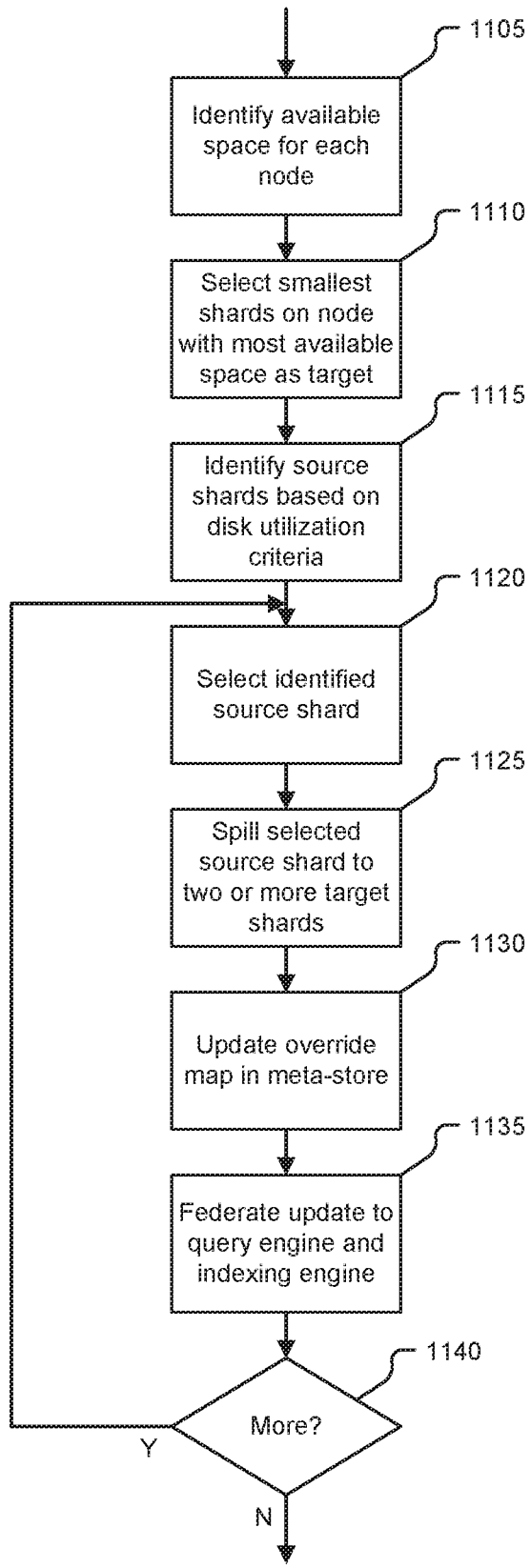
FIG. 11 is a flowchart illustrating an exemplary process for shard spilling according to another embodiment of the present disclosure.

FIG. 11 is a flowchart illustrating an exemplary process for shard spilling according to another embodiment of the present disclosure. As illustrated in this example, spilling over a source shard of the plurality of physical shards to a target shard of the plurality of target shards can comprise identifying 1105 available space for each node of the plurality of node in a cluster of the one or more clusters. A plurality of target shards can be selected 1110 based on an overhead capacity of each shard of the plurality of shards on a node of the plurality of node having a most available space. One or more source shards can also be identified 115 based on one or more overhead criteria.

One of the identified one or more source shards can be selected 1120 and spilled 1125 to the selected plurality of target shards. An override map of the meta-store for the source shard and each target shard can be updated 1130 and the update can be federated 1135 to one or more components of the cloud-based storage system, e.g., a query engine and/or indexers as will be described below. A determination 1140 can be made as to whether all of the identified one or more source shards have been spilled to the plurality of target shards. In response to determining 1140 not all of the identified one or more source shards have been spilled to the plurality of target shards, the selecting 1120 one of the identified one or more source shards, spilling 1125 the selected one of the identified one or more source shards to the selected plurality of target shards, updating 1130 the override map of the meta-store for the source shard and each target shard, and federating 135 the update to the override map of the meta-store for the source shard and each target shard to one or more components of the cloud-based storage system can be repeated until a determination 1140 is made that all of the identified one or more source shards have been spilled to the plurality of target shards.

Partial re-index scaling can comprise a greedy distribution of the largest key ranges (and hence shards) across the new machines instead of trying to uniformly distribute all key ranges. The high level steps involved in this process can be: if adding k new machines, pick 3 k largest shards based on index size; redirect traffic for those shards to a different cluster; split the key ranges of each of these shards in half and generate a new shards table for the cluster; index half of it on the old machine and the other half on one of the new machines (the assignment could be done based on bin-packing by qps again); update the cluster config and version of shard ranges in the coordinator; and reroute traffic back to the cluster for impacted shards.

Figure 12:
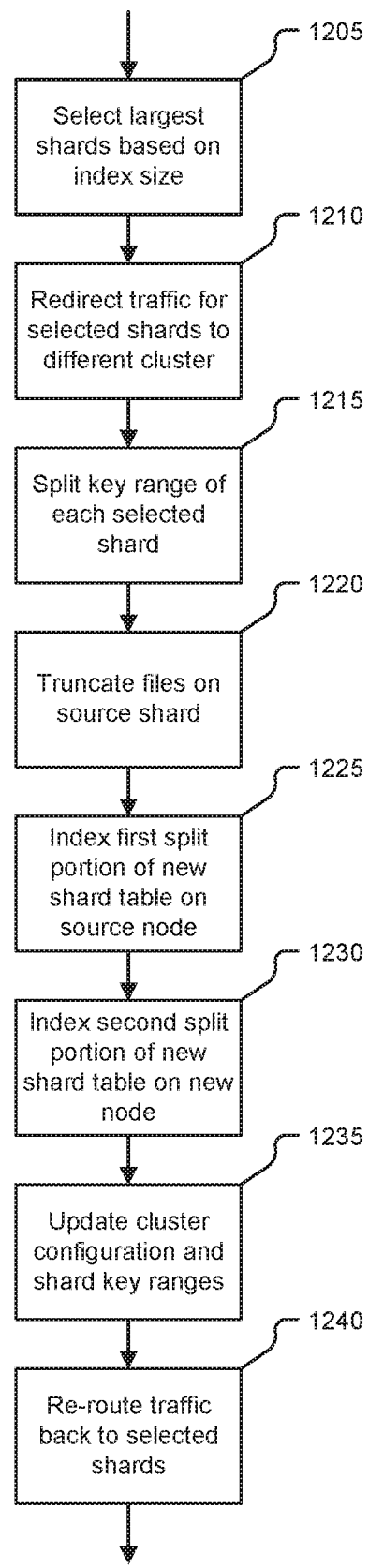
FIG. 12 is a flowchart illustrating an exemplary process for partial re-indexing according to one embodiment of the present disclosure.

FIG. 12 is a flowchart illustrating an exemplary process for partial re-indexing according to one embodiment of the present disclosure. As illustrated in this example, partially re-indexing the plurality of shards of the one or more clusters based on addition of a node to the plurality of node in the one or more clusters can comprise selecting 1205 a set of largest shards in the one or more clusters based on an index size of each shard. Traffic for each shard of the selected set of shards can be re-directed 1210 to a different cluster of the one or more clusters. A key range for each shard of the selected set of largest shards can be split 1215 in half and a new shard table for the cluster containing the selected set of largest shards can be generated 1220. A first half of the key range for each shard of the selected set of largest shards can be indexed 1225 on a source node for the shard and a second half of the key range for each shard of the selected set of largest shards can be indexed 1230 on a node different from the source node for the shard. Cluster configuration information and shard key ranges in the meta-store of each node can be updated 1235 based on the partial re-indexing and traffic can be re-directed 1240 back to each shard of the selected set of shards.

Figure 13:
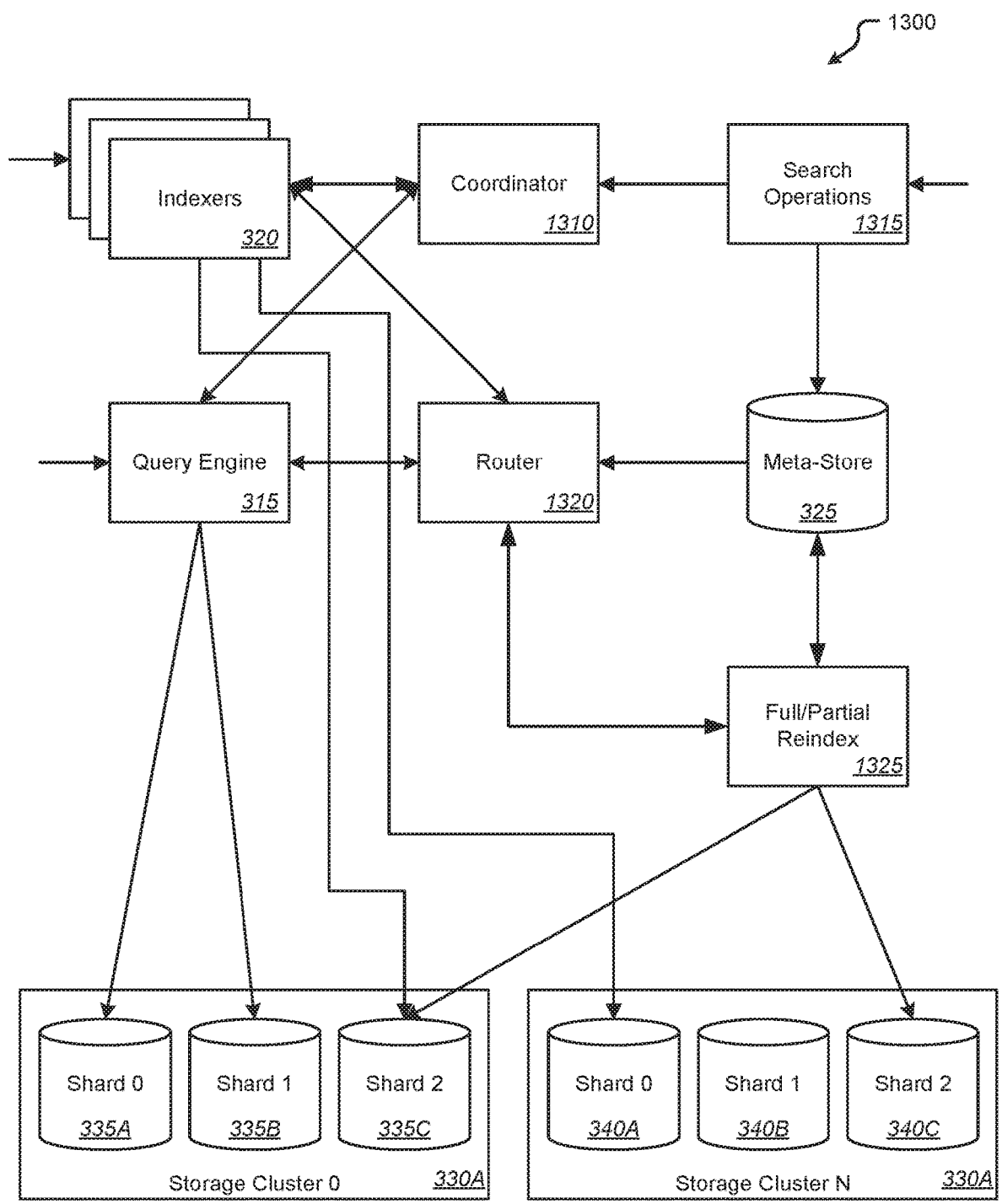
FIG. 13 is a block diagram illustrating elements of an exemplary architecture of a system for performing sharding according to one embodiment of the present disclosure.

FIG. 13 is a block diagram illustrating elements of an exemplary architecture of a system for performing sharding according to one embodiment of the present disclosure. As illustrated in this example, the system 1300 can include a router 1320. Generally speaking, the router 1320 can comprise a library which implements the shard routing mechanisms described herein. Services or other components of the system 1300 can create an instance of this library at startup.

In operations, the router 1320 can scan the tables in the meta-store 325 that contain the logical shard keys and physical shard mapping information for each cluster 330A-330B. The router 1320 can also read any override mappings (as will be described) present for the cluster. The shard routing information can be cached in-memory by the router to reduce the number of expensive database read operations performed. The router can also keep track of the versions of mappings it has read from the meta-store and enable search operations 1315 to be executed which can lead to change in these version. When such operations are executed the router can update the mapping cached in-memory from the meta-store and report the version it read back to the coordinator 1310.

At index time, the system 1300 can use the router 1320 to fetch the shard to which the document should be routed based on its enterprise_id, folder_id, and file_id. The router 1320 can construct the sharding key for this file using the provided information and can identify the appropriate logical shard based on the key-range shard boundaries. The router 1320 can then look up the logical to physical shard mapping and any corresponding overrides and return the physical shard id for that logical shard. The requesting service can then determine the machine and port for that shard_id based on the cluster configuration as known in the art.

At query time, the router 1320 can construct the minimum key possible for each enterprise_id and can use that to lookup the corresponding logical shard in the key range. The router can also check the shard boundaries for that logical shard to determine if the hash of the enterprise_id matches. If so, the enterprise may have files on the next shard which should also be queried. The router continues iterating through consecutive logical shards till the max key differs. In this way the router can perform linear probing to identify all logical shards that the enterprise exists on. If any overrides exist for those shards they can also be added to the fanout list for this query and the router can return to the query engine 315 a list of distinct physical shard_ids. The query engine 315 can then route the query to these shards based on the cluster configuration. If the router receives a notification of update to override mappings for any cluster from the coordinator 1310, it will update its cache of information from the meta-store. If configured, the router will notify the coordinator that it successfully read the latest version. The coordination mechanism is explained in more detail below.

As noted above, the meta-store 325 can comprise a persistent store for the key ranges as well as any override mappings. The meta-store can maintain number of tables including, but not limited to a key range table, a shards table, and an override table. The key range table can contain the sharding keys for each file as shown above. Hence, this table keeps track of the sharding keys for each file and can be backfilled using a map-reduce job for existing documents from the document store and the rest will be taken care of by live indexing.

The shards table can contain the max key for each logical shard and its corresponding physical shard id. The physical shard id can then be used to identify the machine and port from the cluster configuration. This way, the machines in a cluster can be altered without requiring to update the shards table. The cluster information can be scanned by the router instances when one is created and can be cached in memory for routing purposes. When the key ranges are updated for scaling purposes, such as adding a new machine to the cluster, the corresponding data can be purged and regenerated.

The override table can be used to implement shard spilling as described above. It can contain the override mappings in place at any given time to spill over shards running low on space to other shard(s). Initially, the table can be empty for each cluster since there would be no overrides. Each row in this table can contain a version of the override map to be used by a specific cluster and the corresponding overrides. The version to be read can be stored in the coordinator 1310. When a new override is added, the updated override map can be inserted as a new row in this table and the version id would be updated in the coordinator 1310. The override update mechanism can be implemented as a search operations 1315 command, for example. The override information for a specific cluster can be deleted when the shards table is regenerated since at that point all shards are of uniform size and no spillover is necessary.

In operation, search operations 1315 can scan the key range table in the meta-store 325 to generate shard ranges, delete rows for that cluster in the shards table, and regenerate the shards table. Search operations 1315 can then write updated override mappings to override table and delete rows for that cluster in the override table after regenerating shard ranges.

Full/Partial re-index 1325 can scan the key range table for a full re-index or scan specific key ranges for re-indexing specific shards/machines. Additionally, or alternatively, it can look up the document store to get content of individual files for re-indexing based on the row meta-stored in the key range table.

Indexers 320 can create a new instance of the router at service startup and use the router to lookup destination shards for files instead of distributing them randomly. For new files, indexers can write the shard key and associated document store key to the meta-store key range table. For file deletes, indexers can remove the shard key from the meta-store key range table. For updates to a file's folder_id or enterprise_id, indexers can delete the old shard key of the file and add the new key in the meta-store key range table. If this change causes the destination shard of the file to change, the document can be deleted from the old shard and added to the new shard.

Query engine 315 can also create a new instance of the router at service startup and use the router to lookup fanout shards for queries based on the user enterprise_id as well as any collaborated enterprise ids. This information can be fetched by the Webapp (described above) and can be provided to query engine at query time.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for distributing data across a plurality of storage shards, the method comprising:
   generating, by a server of a cloud-based storage system, a file key for each file of a plurality of files stored in a plurality of physical shards, each physical shard maintained by a node of a plurality of nodes in one or more clusters, wherein the file key comprises a hash of an enterprise identifier (enterprise ID) for an entity to which the creator of the file is a member, a hash of a folder identifier (folder ID) for a location in which the file is stored, and a hash of a file identifier (file ID) uniquely identifying the file;
   sorting, by the server of the cloud-based storage system, the generated file keys for each file of the plurality of files into an ordered list;
   logically partitioning, by the server of the cloud-based storage system, the ordered list into a plurality of logical shards;
   mapping, by the server of the cloud-based storage system, each logical shard of the plurality of logical shards to one of the plurality of physical shards;
   identifying, by the server of the cloud-based storage system, a last key value for each logical shard in the partitioned ordered list;
   saving, by the server of the cloud-based storage system, the identified last key value for each logical shard in a meta-store for the physical shard to which the logical shard is mapped; and
   partially re-indexing, by the server of the cloud-based storage system, the plurality of shards of the one or more clusters based on addition of a node to the plurality of node in the one or more clusters, wherein partially re-indexing the plurality of shards comprises selecting a set of largest shards in the one or more clusters based on an index size of each shard, redirecting traffic for each shard of the selected set of shards to a different cluster of the one or more clusters while the plurality of shards are being partially reindexed, and re-directing traffic back to each shard of the selected set of shards upon completion of partially reindexing the plurality of shards.

2. The method of claim 1, further comprising indexing a new file in the plurality of physical shards, wherein the indexing comprises:
   receiving, by the server of the cloud-based storage system, the new file;
   generating, by the server of the cloud-based storage system, a file key for the new file;

identifying, by the server of the cloud-based storage system, a target shard for the new file based on the generated file key for the new file and the saved identified last key value for each logical shard saved in the meta-store for each physical shard; and routing, by the server of the cloud-based storage system, the new file to the identified target shard.

3. The method of claim 1, further comprising processing a query from a user, wherein processing the query comprises:

receiving, by the server of the cloud-based storage system, an enterprise ID associated with the user;

identifying, by the server of the cloud-based storage system, one or more shards based on the received enterprise ID associated with the user and the saved identified last key value for each logical shard saved in the meta-store for each physical shard; and routing, by the server of the cloud-based storage system, the query to the identified one or more shards.

4. The method of claim 1, wherein mapping each logical shard of the plurality of logical shards to one of the plurality of physical shards further comprises:

sorting, by the server of the cloud-based storage system, the plurality of logical shards in descending order based on a load of each logical shard;

assigning, by the server of the cloud-based storage system, one logical shard beginning from a top of the sorted ordered list to each physical shard of the plurality of physical shards;

sorting, by the server of the cloud-based storage system, remaining unassigned logical shards in ascending order based on the load of each remaining unassigned logical shard;

assigning, by the server of the cloud-based storage system, one logical shard beginning from the top of the sorted ordered list to each physical shard of the plurality of physical shards;

determining, by the server of the cloud-based storage system, whether all logical shards have been assigned to a physical shard; and in response to determining not all logical shards have been assigned to a physical shard, repeating, by the server of the cloud-based storage system, said sorting of the plurality of logical shards in descending order based on a load of each logical shard, assigning one logical shard beginning from a top of the sorted ordered list to each physical shard of the plurality of physical shards, sorting of remaining unassigned logical shards in ascending order based on the load of each remaining unassigned logical shard, and assigning one logical shard beginning from the top of the sorted ordered list to each physical shard of the plurality of physical shards until all logical shards have been assigned to a physical shard.

5. The method of claim 1, further comprising spilling over a source shard of the plurality of physical shards to a target shard of the plurality of target shards, wherein spilling over the source shard to the target shard comprises:

identifying, by the server of the cloud-based storage system, the source shard based on available storage capacity of each physical shard of the plurality of physical shards;

identifying, by the server of the cloud-based storage system, the target shard based on the available storage capacity of each physical shard of the plurality of physical shards;

spilling, by the server of the cloud-based storage system, content from the source shard to the target shard;

updating, by the server of the cloud-based storage system, an override map of the meta-store for the source shard and the target shard; and federating, by the server of the cloud-based storage system, the update to the override map of the meta-store for the source shard and the target shard to one or more components of the cloud-based storage system.

6. The method of claim 1, further comprising spilling over a source shard of the plurality of physical shards to a target shard of the plurality of target shards, wherein spilling over the source shard to the target shard comprises:

identifying, by the server of the cloud-based storage system, available space for each node of the plurality of node in a cluster of the one or more clusters;

selecting, by the server of the cloud-based storage system, a plurality of target shards based on an overhead capacity of each shard of the plurality of shards on a node of the plurality of node having a most available space;

identifying, by the server of the cloud-based storage system, one or more source shards based on one or more overhead criteria;

selecting, by the server of the cloud-based storage system, one of the identified one or more source shards;

spilling, by the server of the cloud-based storage system, the selected one of the identified one or more source shards to the selected plurality of target shards;

updating, by the server of the cloud-based storage system, an override map of the meta-store for the source shard and each target shard;

federating, by the server of the cloud-based storage system, the update to the override map of the meta-store for the source shard and each target shard to one or more components of the cloud-based storage system;

determining, by the server of the cloud-based storage system, whether all of the identified one or more source shards have been spilled to the plurality of target shards; and in response to determining not all of the identified one or more source shards have been spilled to the plurality of target shards, repeating, by the server of the cloud-based storage system, the selecting one of the identified one or more source shards, spilling the selected one of the identified one or more source shards to the selected plurality of target shards, updating the override map of the meta-store for the source shard and each target shard, and federating the update to the override map of the meta-store for the source shard and each target shard to one or more components of the cloud-based storage system until all of the identified one or more source shards have been spilled to the plurality of target shards.

7. The method of claim 1, wherein partially re-indexing the plurality of shards further comprises:

splitting, by the server of the cloud-based storage system, a key range for each shard of the selected set of largest shards in half;

generating, by the server of the cloud-based storage system, a new shard table for the cluster containing the selected set of largest shards;

indexing, by the server of the cloud-based storage system, a first half of the key range for each shard of the selected set of largest shards on a source node for the shard;

indexing, by the server of the cloud-based storage system, a second half of the key range for each shard of the selected set of largest shards on a node different from the source node for the shard; and updating, by the server of the cloud-based storage system, cluster configuration information and shard key ranges in the meta-store of each node based on the partial re-indexing.

8. A server of a cloud-based storage system, the server comprising:

a processor; and a memory coupled with and readable by the processor and storing therein a set of instructions which, when executed by the processor, causes the processor to distribute data across a plurality of storage shards by:

generating a file key for each file of a plurality of files stored in a plurality of physical shards, each physical shard maintained by a node of a plurality of nodes in one or more clusters, wherein the file key comprises a hash of an enterprise identifier (enterprise ID) for an entity to which the creator of the file is a member, a hash of a folder identifier (folder ID) for a location in which the file is stored, and a hash of a file identifier (file ID) uniquely identifying the file;

sorting the generated file keys for each file of the plurality of files into an ordered list;

logically partitioning the ordered list into a plurality of logical shards;

mapping each logical shard of the plurality of logical shards to one of the plurality of physical shards;

identifying a last key value for each logical shard in the partitioned ordered list;

saving the identified last key value for each logical shard in a meta-store for the physical shard to which the logical shard is mapped; and partially re-indexing the plurality of shards of the one or more clusters based on addition of a node to the plurality of node in the one or more clusters, wherein partially re-indexing the plurality of shards comprises selecting a set of largest shards in the one or more clusters based on an index size of each shard, redirecting traffic for each shard of the selected set of shards to a different cluster of the one or more clusters while the plurality of shards are being partially reindexed, and re-directing traffic back to each shard of the selected set of shards upon completion of partially reindexing the plurality of shards.

9. The server of claim 8, wherein the instructions further cause the processor to index a new file in the plurality of physical shards by:

receiving the new file;

generating a file key for the new file;

identifying a target shard for the new file based on the generated file key for the new file and the saved identified last key value for each logical shard saved in the meta-store for each physical shard; and routing the new file to the identified target shard.

10. The server of claim 8, wherein the instructions further cause the processor to process a query from a user by:

receiving an enterprise ID associated with the user;

identifying one or more shards based on the received enterprise ID associated with the user and the saved identified last key value for each logical shard saved in the meta-store for each physical shard; and routing the query to the identified one or more shards.

11. The server of claim 8, wherein mapping each logical shard of the plurality of logical shards to one of the plurality of physical shards further comprises:

sorting the plurality of logical shards in descending order based on a load of each logical shard;

assigning one logical shard beginning from a top of the sorted ordered list to each physical shard of the plurality of physical shards;

sorting remaining unassigned logical shards in ascending order based on the load of each remaining unassigned logical shard;

assigning one logical shard beginning from the top of the sorted ordered list to each physical shard of the plurality of physical shards;

determining whether all logical shards have been assigned to a physical shard; and in response to determining not all logical shards have been assigned to a physical shard, repeating said sorting of the plurality of logical shards in descending order based on a load of each logical shard, assigning one logical shard beginning from a top of the sorted ordered list to each physical shard of the plurality of physical shards, sorting of remaining unassigned logical shards in ascending order based on the load of each remaining unassigned logical shard, and assigning one logical shard beginning from the top of the sorted ordered list to each physical shard of the plurality of physical shards until all logical shards have been assigned to a physical shard.

12. The server of claim 8, wherein the instructions further cause the processor to spill over a source shard of the plurality of physical shards to a target shard of the plurality of target shards by:

identifying the source shard based on available storage capacity of each physical shard of the plurality of physical shards;

identifying the target shard based on the available storage capacity of each physical shard of the plurality of physical shards;

spilling content from the source shard to the target shard;

updating an override map of the meta-store for the source shard and the target shard; and federating the update to the override map of the meta-store for the source shard and the target shard to one or more components of the cloud-based storage system.

13. The server of claim 8, wherein the instructions further cause the processor to spill over a source shard of the plurality of physical shards to a target shard of the plurality of target shards by:

identifying available space for each node of the plurality of node in a cluster of the one or more clusters;

selecting a plurality of target shards based on an overhead capacity of each shard of the plurality of shards on a node of the plurality of node having a most available space;

identifying one or more source shards based on one or more overhead criteria;

selecting one of the identified one or more source shards;

spilling the selected one of the identified one or more source shards to the selected plurality of target shards;

updating an override map of the meta-store for the source shard and each target shard;

federating the update to the override map of the meta-store for the source shard and each target shard to one or more components of the cloud-based storage system;

determining whether all of the identified one or more source shards have been spilled to the plurality of target shards; and in response to determining not all of the identified one or more source shards have been spilled to the plurality of target shards, repeating the selecting one of the identified one or more source shards, spilling the selected one of the identified one or more source shards to the selected plurality of target shards, updating the override map of the meta-store for the source shard and each target shard, and federating the update to the override map of the meta-store for the source shard and each target shard to one or more components of the cloud-based storage system until all of the identified one or more source shards have been spilled to the plurality of target shards.

14. The server of claim 8, wherein partially re-indexing the plurality of shards of the one or more clusters further comprises:

splitting a key range for each shard of the selected set of largest shards in half;

generating a new shard table for the cluster containing the selected set of largest shards;

indexing a first half of the key range for each shard of the selected set of largest shards on a source node for the shard;

indexing a second half of the key range for each shard of the selected set of largest shards on a node different from the source node for the shard; and updating cluster configuration information and shard key ranges in the meta-store of each node based on the partial re-indexing.

15. A non-transitory, computer-readable medium comprising a set of instructions stored therein which, when executed by a processor, causes the processor to distribute data across a plurality of storage shards by:

generating a file key for each file of a plurality of files stored in a plurality of physical shards, each physical shard maintained by a node of a plurality of nodes in one or more clusters, wherein the file key comprises a hash of an enterprise identifier (enterprise ID) for an entity to which the creator of the file is a member, a hash of a folder identifier (folder ID) for a location in which the file is stored, and a hash of a file identifier (file ID) uniquely identifying the file;

sorting the generated file keys for each file of the plurality of files into an ordered list;

logically partitioning the ordered list into a plurality of logical shards;

mapping each logical shard of the plurality of logical shards to one of the plurality of physical shards;

identifying a last key value for each logical shard in the partitioned ordered list;

saving the identified last key value for each logical shard in a meta-store for the physical shard to which the logical shard is mapped; and partially re-indexing the plurality of shards of the one or more clusters based on addition of a node to the plurality of node in the one or more clusters, wherein partially re-indexing the plurality of shards comprises selecting a set of largest shards in the one or more clusters based on an index size of each shard, redirecting traffic for each shard of the selected set of shards to a different cluster of the one or more clusters while the plurality of shards are being partially reindexed, and re-directing traffic back to each shard of the selected set of shards upon completion of partially reindexing the plurality of shards.

16. The non-transitory, computer-readable medium of claim 15, wherein the instructions further cause the processor to index a new file in the plurality of physical shards by:

receiving the new file;

generating a file key for the new file;

identifying a target shard for the new file based on the generated file key for the new file and the saved identified last key value for each logical shard saved in the meta-store for each physical shard; and routing the new file to the identified target shard.

17. The non-transitory, computer-readable medium of claim 15, wherein the instructions further cause the processor to process a query from a user by:

receiving an enterprise ID associated with the user;

identifying one or more shards based on the received enterprise ID associated with the user and the saved identified last key value for each logical shard saved in the meta-store for each physical shard; and routing the query to the identified one or more shards.

18. The non-transitory, computer-readable medium of claim 15, wherein mapping each logical shard of the plurality of logical shards to one of the plurality of physical shards further comprises:

sorting the plurality of logical shards in descending order based on a load of each logical shard;

assigning one logical shard beginning from a top of the sorted ordered list to each physical shard of the plurality of physical shards;

sorting remaining unassigned logical shards in ascending order based on the load of each remaining unassigned logical shard;

assigning one logical shard beginning from the top of the sorted ordered list to each physical shard of the plurality of physical shards;

determining whether all logical shards have been assigned to a physical shard; and in response to determining not all logical shards have been assigned to a physical shard, repeating said sorting of the plurality of logical shards in descending order based on a load of each logical shard, assigning one logical shard beginning from a top of the sorted ordered list to each physical shard of the plurality of physical shards, sorting of remaining unassigned logical shards in ascending order based on the load of each remaining unassigned logical shard, and assigning one logical shard beginning from the top of the sorted ordered list to each physical shard of the plurality of physical shards until all logical shards have been assigned to a physical shard.

19. The non-transitory, computer-readable medium of claim 15, wherein the instructions further cause the processor to spill over a source shard of the plurality of physical shards to a target shard of the plurality of target shards by:

identifying the source shard based on available storage capacity of each physical shard of the plurality of physical shards;

identifying the target shard based on the available storage capacity of each physical shard of the plurality of physical shards;

spilling content from the source shard to the target shard;

updating an override map of the meta-store for the source shard and the target shard; and federating the update to the override map of the meta-store for the source shard and the target shard to one or more components of the cloud-based storage system.

20. The non-transitory, computer-readable medium of claim 15, wherein the instructions further cause the processor to spill over a source shard of the plurality of physical shards to a target shard of the plurality of target shards by:
identifying available space for each node of the plurality of node in a cluster of the one or more clusters;
selecting a plurality of target shards based on an overhead capacity of each shard of the plurality of shards on a node of the plurality of node having a most available space;
identifying one or more source shards based on one or more overhead criteria;
selecting one of the identified one or more source shards;
spilling the selected one of the identified one or more source shards to the selected plurality of target shards;
updating an override map of the meta-store for the source shard and each target shard;
federating the update to the override map of the meta-store for the source shard and each target shard to one or more components of the cloud-based storage system;
determining whether all of the identified one or more source shards have been spilled to the plurality of target shards; and
in response to determining not all of the identified one or more source shards have been spilled to the plurality of target shards, repeating the selecting one of the identified one or more source shards, spilling the selected one of the identified one or more source shards to the selected plurality of target shards, updating the override map of the meta-store for the source shard and each target shard, and federating the update to the override map of the meta-store for the source shard and each target shard to one or more components of the cloud-based storage system until all of the identified one or more source shards have been spilled to the plurality of target shard.

\* \* \* \* \*